US009123351B2

(12) United States Patent
Katagiri

(10) Patent No.: US 9,123,351 B2
(45) Date of Patent: Sep. 1, 2015

(54) SPEECH SEGMENT DETERMINATION DEVICE, AND STORAGE MEDIUM

(75) Inventor: Kazuhiro Katagiri, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 309 days.

(21) Appl. No.: 13/399,905

(22) Filed: Feb. 17, 2012

(65) Prior Publication Data

US 2012/0253813 A1 Oct. 4, 2012

(30) Foreign Application Priority Data

Mar. 31, 2011 (JP) ................................ 2011-078895

(51) Int. Cl.

| | |
|---|---|
| ***G10L 15/00*** | (2013.01) |
| ***G10L 15/20*** | (2006.01) |
| ***G10L 21/00*** | (2013.01) |
| ***G10L 25/93*** | (2013.01) |
| ***G10L 17/00*** | (2013.01) |
| ***G10L 25/78*** | (2013.01) |
| *G10L 25/21* | (2013.01) |

(52) U.S. Cl.

CPC ................ *G10L 25/78* (2013.01); *G10L 25/21* (2013.01); *G10L 2025/786* (2013.01)

(58) Field of Classification Search

CPC .......... G10L 15/04; G10L 15/05; G10L 15/20
USPC ......... 704/210, 214, 215, 226–228, 233, 248, 704/253
See application file for complete search history.

(56) References Cited

U.S. PATENT DOCUMENTS

| | | | | |
|---|---|---|---|---|
| 5,633,936 | A | 5/1997 | Oh | |
| 7,146,315 | B2 * | 12/2006 | Balan et al. | 704/233 |
| 7,478,043 | B1 * | 1/2009 | Preuss | 704/233 |
| 8,412,525 | B2 * | 4/2013 | Mukerjee et al. | 704/254 |
| 2002/0116187 | A1 * | 8/2002 | Erten | 704/233 |
| 2005/0091050 | A1 * | 4/2005 | Surendran et al. | 704/226 |

(Continued)

FOREIGN PATENT DOCUMENTS

| | | | |
|---|---|---|---|
| JP | H04-24693 | A | 1/1992 |
| JP | H08-274690 | A | 10/1996 |
| JP | 2008-257110 | A | 10/2008 |

OTHER PUBLICATIONS

J. Shen et al. "Robust entropy-based endpoint detection for speech recognition in noisy environments", ICSLP-98, 1998.

(Continued)

*Primary Examiner* — Jesse Pullias
(74) *Attorney, Agent, or Firm* — Rabin & Berdo, P.C.

(57) ABSTRACT

A speech segment determination device includes a frame division portion, a power spectrum calculation portion, a power spectrum operation portion, a spectral entropy calculation portion and a determination portion. The frame division portion divides an input signal in units of frames. The power spectrum calculation portion calculates, using an analysis length, a power spectrum of the input signal for each of the frames that have been divided. The power spectrum operation portion adds a value of the calculated power spectrum to a value of power spectrum in each of frequency bins. The spectral entropy calculation portion calculates spectral entropy using the power spectrum whose value has been increased. The determination portion determines, based on a value of the spectral entropy, whether the input signal is a signal in a speech segment.

6 Claims, 6 Drawing Sheets

(56) References Cited

U.S. PATENT DOCUMENTS

| | | | | |
|---|---|---|---|---|
| 2008/0201137 | A1* | 8/2008 | Vos et al. | 704/226 |
| 2009/0177423 | A1 | 7/2009 | Hong et al. | |
| 2009/0254341 | A1* | 10/2009 | Yamamoto et al. | 704/233 |
| 2010/0036663 | A1* | 2/2010 | Rangarao et al. | 704/240 |

OTHER PUBLICATIONS

P. Renevey, "Entropy based voice activity detection in very noisy conditions", Proceedings of 7th European Conference on Speech Communication and Technology, Eurospeech 2001, pp. 1887-1890, 2001.

* cited by examiner

SPEECH SEGMENT DETERMINATION DEVICE, AND STORAGE MEDIUM

BACKGROUND OF THE INVENTION

1. Field of the Invention

The present invention relates to a technology that determines a speech segment included in an input signal.

2. Description of Related Art

In related art, in order to determine whether or not a speech signal is included in an input signal, the power of the signal is mainly used to determine a speech segment. The power of the signal is the time average of the square of the amplitude of the signal. However, when the level of the signal itself varies, it is difficult to accurately determine the speech segment based on the power of the signal. The level of the signal indicates the scale of the signal.

To address this, a method for determining a speech segment using spectral entropy that can be obtained based on an input signal is disclosed in the following document: J. Shen, J. Hung, and L. Lee, "Robust entropy-based endpoint detection for speech recognition in noisy environments", ICSLP-98, 1998.

However, when non-stationary noise, in which a power spectrum of a noise component varies with time, is included in the input signal, it is difficult to accurately determine the speech segment in real time.

SUMMARY OF THE INVENTION

The present invention provides a speech segment determination device, a speech segment determination method and a program that are capable of accurately determining a speech segment in real time even when non-stationary noise is included in an input signal.

A speech segment determination device according to the present invention includes a frame division portion, a power operation portion, a spectrum entropy calculation portion and a determination portion. The frame division portion divides an input signal in units of frames. The power operation portion increases power of the input signal for each of the frames. The spectral entropy calculation portion calculates spectral entropy using the input signal whose power has been increased. The determination portion determines whether the input signal is a signal in a speech segment, based on a value of the spectral entropy calculated by the spectral entropy calculation portion.

Further, a speech segment determination device according to the present invention includes a frame division portion, a power spectrum calculation portion, a power spectrum operation portion, a spectral entropy calculation portion and a determination portion. The frame division portion divides an input signal in units of frames. The power spectrum calculation portion calculates a power spectrum of each of an analysis length for each of the frames. The power spectrum operation portion increases a value of the power spectrum. The spectral entropy calculation portion calculates spectral entropy using the power spectrum whose value has been increased. The determination portion determines whether the input signal is a signal in a speech segment, based on a value of the spectral entropy calculated by the spectral entropy calculation portion.

DETAILED DESCRIPTION OF THE EMBODIMENTS

Figure 1:
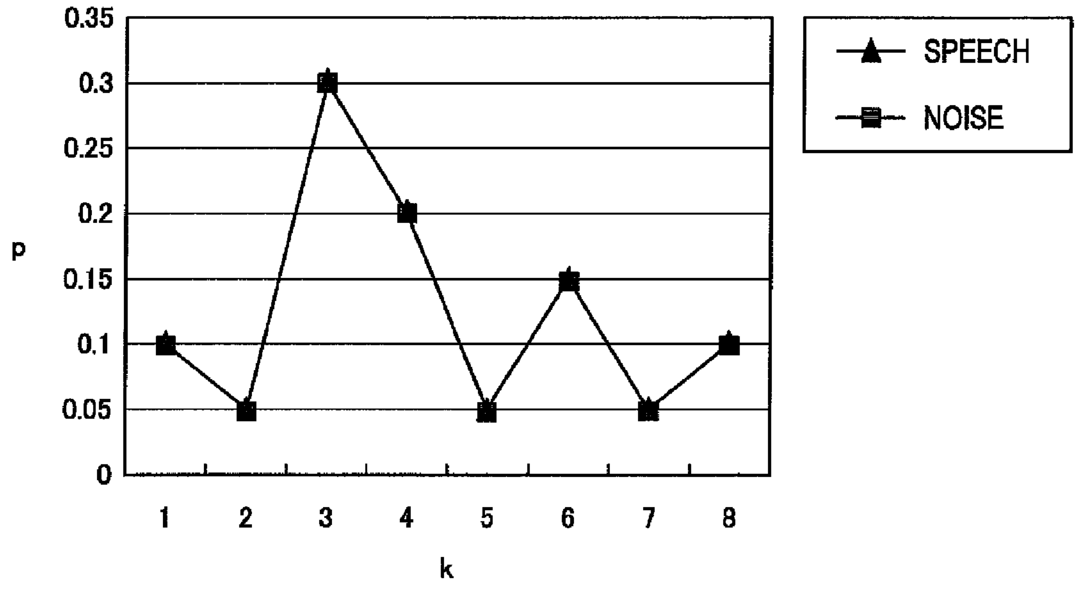
FIG. 1 is a graph showing a $p_k$ relationship that indicates a presence probability of power before an operation on a spectral entropy value, illustrating an overview of a speech segment determination method according to an embodiment.

Hereinafter, embodiments of the present invention will be explained in detail with reference to the appended drawings.

Note that, in this specification and the appended drawings, structural elements that have substantially the same function and structure are denoted with the same reference numerals, and repeated explanation of these structural elements is omitted.

1. Overview

Generally, a method that uses spectral entropy of an input signal is proposed as a method for determining a segment (a speech segment) including a speech signal. The spectral entropy is defined as entropy obtained from a certain probability distribution. The probability distribution corresponds to a power spectrum distribution in each frequency of an input signal in a predetermined segment. The spectral entropy is a feature quantity indicating uniformity of the input signal. The uniform input signal indicates that the spectral distribution of the input signal is uniform. When the distribution (probability distribution) of the power spectrum is uniform, namely, when the input signal is white noise, the spectral entropy has a high value. On the other hand, when the probability distribution is not uniform (varies widely), namely, when the input signal is colored noise, the spectral entropy has a low value. The colored noise is noise in which the power spectrum distribution is not uniform. It can be said that the speech signal is a type of the colored noise. Therefore, the probability distribution of the speech signal is not uniform and the spectral entropy has a low value. This property can be used to determine the speech segment.

A speech segment determination method that uses the spectral entropy has an advantage in that this method is robust against signal level fluctuation, as compared to a case in which signal power is used. Since the spectral entropy is a normalized value, even if the signal level varies, the spectral entropy does not vary unless the power spectrum distribution changes. Note that the power spectrum distribution is, for example, a distribution such as that shown in FIG. 1 or FIG. 2. When the signal level changes, in the above-described speech segment determination method that uses the signal power, a threshold value for the signal power that is used to distinguish between the speech signal and noise is set again. On the other hand, in the speech segment determination method that uses the spectral entropy, even if the signal level varies, the value of the spectral entropy is stable. Therefore, a threshold value for the spectral entropy that is used to determine the speech segment is not set again.

As described above, the value of the spectral entropy of the white noise differs significantly from that of the speech signal. Therefore, even when the white noise is included in the input signal, it is possible to accurately determine the speech segment based on the spectral entropy. However, the spectral entropy values of the colored noise and the speech signal are both low. Therefore, when the colored noise is included in the input signal, there is only a small difference between the spectral entropy value in the speech segment and the spectral entropy value in a non-speech segment, and determination accuracy deteriorates. To address this, a method for accurately determining the speech segment is required also for the input signal including the colored noise.

With respect to the input signal that includes stationary colored noise in which the power spectrum does not change with time, it is possible to improve accuracy of the speech segment determination by estimating the power spectrum of the stationary colored noise and by removing an influence caused by the colored noise being included in the input signal. A method for smoothing the power spectrum of a noise component is described in the following document: P. Renevey and A. Drygajlo, "Entropy based voice activity detection in very noisy conditions", Eurospeech 2001, 2001. In this method, the power spectrum of the stationary noise is estimated in advance and the power spectrum of the input signal is divided by the estimated power spectrum of the stationary noise, thereby smoothing the power spectrum of the noise component. When the estimated power spectrum of the stationary noise matches an actual noise power spectrum, the power spectrum values are all "1" as a result of the aforementioned division. By performing the above processing, the value of the spectral entropy in a segment including the stationary colored noise becomes higher as compared to the spectral entropy value in the speech segment. As a result, a difference between the spectral entropy value in the speech segment and the spectral entropy value in the segment including the stationary colored noise becomes larger, and the accuracy of the speech segment determination is thus improved.

With respect to the input signal that includes non-stationary colored noise in which the power spectrum changes with time, it is possible to improve accuracy of the speech segment determination by using an identifier that has undergone learning in advance. US patent application publication No. 2009/0254341 discloses a method for determining a speech segment using a feature vector, which utilizes information of the power spectrum and the spectral entropy for a target frame and several frames before and after the target frame. This method uses features of the frames before and after the target frame. Therefore, it takes time to perform speech segment determination processing and real time processing cannot be performed. Further, the identifier needs to undergo learning in advance, and a memory for storing learning data is also necessary.

To address this, the present application discloses a device and a method that are capable of improving accuracy of speech segment determination for both an input signal including stationary noise and an input signal including non-stationary noise. This method can perform real time processing.

Figure 2:
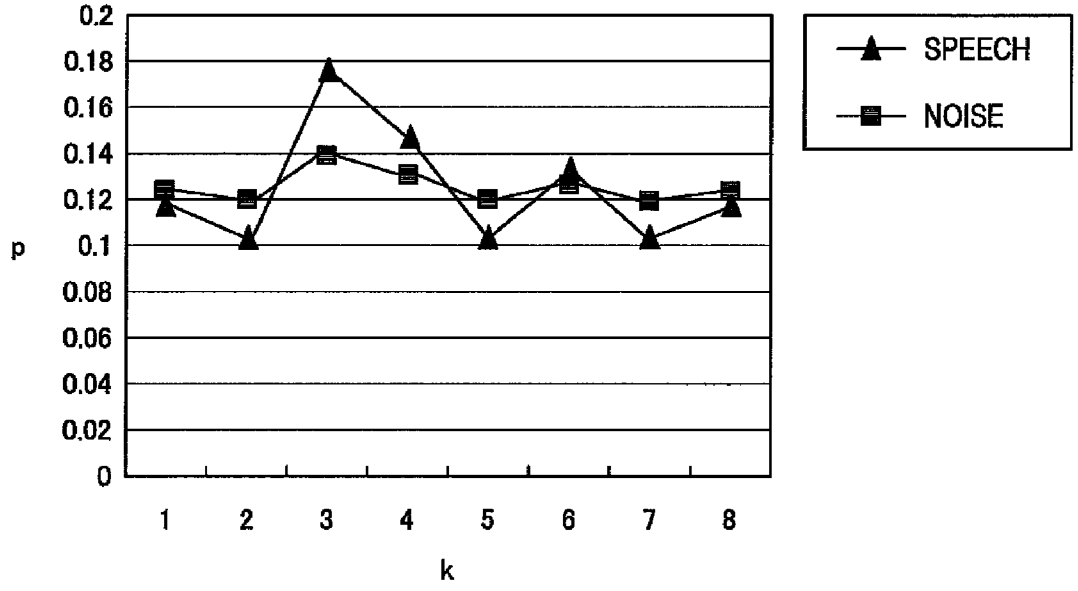
FIG. 2 is a graph showing a $p_k$ relationship that indicates a presence probability of power after the operation on the spectral entropy value, illustrating the overview of the speech segment determination method according to the embodiment.

Here, an overview of speech segment determination according to an embodiment will be explained with reference to FIG. 1 and FIG. 2. In graphs shown in FIG. 1 and FIG. 2, the vertical axis indicates a presence probability of a power spectrum and the horizontal axis indicates frequency bin numbers (k=1 to 8). The graphs shown in FIG. 1 and FIG. 2 are obtained by graphing data in Table 1 and Table 2, which will be described later, and the graphs represent a transition of the presence probability of speech and noise in each frequency bin (k=1 to 8). As described above, among various types of noise, the white noise has a high spectral entropy value. Further, there is a large difference between the spectral entropy of the white noise and the spectral entropy of the speech signal. Therefore, it is possible to accurately determine the speech segment based on the values of the spectral entropy of the input signal. On the other hand, when the colored noise having a spectral entropy similar to that of the speech signal is included in the input signal, it is difficult to distinguish between the speech signal and the colored noise based on the spectral entropy. Therefore, in the embodiment, the value of the spectral entropy of the colored noise is increased by operating the power spectrum. By operating the power spectrum, the value of the spectral entropy of the colored noise becomes larger than the threshold value used to determine the speech segment. At this time, if the value of the spectral entropy of the speech signal on which the same operation is performed becomes equal to or smaller than the threshold value used to determine the speech segment, it is possible to improve the accuracy of the speech segment determination.

Here, for the sake of convenience, let us consider the speech signal and the colored noise for which the values of spectral entropy H are the same. Note that values described in the explanation below are values that are used to simplify the explanation. k described in Table 1 represents a frequency bin and it can take an integer from 1 to 8. $s_k$ described in Table 1 represents a k-th power spectrum. The spectral entropy H is expressed by Expression 1, which is a function of a presence probability $p_k$ of the power in each frequency bin. Here, M is a lower limit of a frequency range and N is an upper limit of the frequency range. Here, it is preferable that the spectral entropy be calculated for the frequency range in which a speech spectrum is concentrated. The lower limit and the upper limit of the frequency range in which the aforementioned speech spectrum is concentrated can be set to 250 Hz (the lower limit) and 4000 Hz (the upper limit). Here, let us consider a case in which the presence probability $p_k$ of the power in each frequency bin is the same for the colored noise and the speech signal.

TABLE 1

| | Power spectrum $s_k$ | | Presence |
|---|---|---|---|
| k | Colored noise | Speech signal | probability $p_k$ |
| 1 | 2 | 10 | 0.1 |
| 2 | 1 | 5 | 0.05 |
| 3 | 6 | 30 | 0.3 |
| 4 | 4 | 20 | 0.2 |
| 5 | 1 | 5 | 0.05 |
| 6 | 3 | 15 | 0.15 |
| 7 | 1 | 5 | 0.05 |
| 8 | 2 | 10 | 0.1 |

[Expression 1]

$$H = -\sum_{k=M}^{N} p_k \log_2 p_k \qquad \text{Expression 1}$$

Note that the presence probability $p_k$ is expressed by the following Expression 2.

[Expression 2]

$$p_k = \frac{s_k}{\sum_{i=M}^{N} s_i} \qquad \text{Expression 2}$$

When the values of the spectral entropy of the colored noise and the speech signal shown in Table 1 are calculated using Expression 1 and Expression 2, calculated results are both H=2.708695.

In the embodiment, the presence probability is changed by increasing the value of the power spectrum in each frequency bin, and thus operating the value of the spectral entropy. More specifically, a speech segment determination device performs processing shown by the following Expression 3. Note that k shown in Expression 3 can take an integer ranging from 1 to 8.

[Expression 3]

$$s'_k = s_k + \alpha_i \qquad \text{Expression 3}$$

Here, if an increment $\alpha_i$ of the power spectrum is set to 30, the power spectrum and the presence probability after the above-described operation has been performed are as shown in the following Table 2.

TABLE 2

| | Power spectrum $s_k$ | | Presence probability $p_k$ | |
|---|---|---|---|---|
| k | Colored noise | Speech signal | Colored noise | Speech signal |
| 1 | 32 | 40 | 0.123 | 0.118 |
| 2 | 31 | 35 | 0.119 | 0.103 |
| 3 | 36 | 60 | 0.138 | 0.176 |
| 4 | 34 | 50 | 0.131 | 0.147 |
| 5 | 31 | 35 | 0.119 | 0.103 |
| 6 | 33 | 45 | 0.127 | 0.132 |
| 7 | 31 | 35 | 0.119 | 0.103 |
| 8 | 32 | 40 | 0.123 | 0.118 |

In this case, the spectral entropy of the colored noise is H=2.998151 and the spectral entropy of the speech signal is H=2.973895. In this manner, the presence probability in each frequency bin is changed by increasing the power spectrum, and variation of the presence probability is reduced. When the same increment is applied, the degree of change of the presence probability differs depending on the magnitude of the power spectrum before the above-described operation. More specifically, the spectral entropy is increased for both the colored signal and the speech signal by increasing the power spectrum. However, with respect to the speech signal whose power in the frequency bin is large before the above-described operation, the degree of increase of its spectral entropy is smaller than in the case of the colored noise. For that reason, a difference is generated between the spectral entropy value of the colored noise and the spectral entropy value of the speech signal.

More specifically, even when there is no difference in the spectral entropy between the colored noise and the speech signal, when there is a difference in the magnitude of the power spectrum, a difference is generated between the spectral entropy values by operating the power spectrum. In the embodiment, by operating the power spectrum in this manner, the spectral entropy values are operated and the colored noise and the speech signal are distinguished. Hereinafter, a configuration of the speech segment determination device that enables this type of operation will be explained.

2. Configuration

Figure 3:
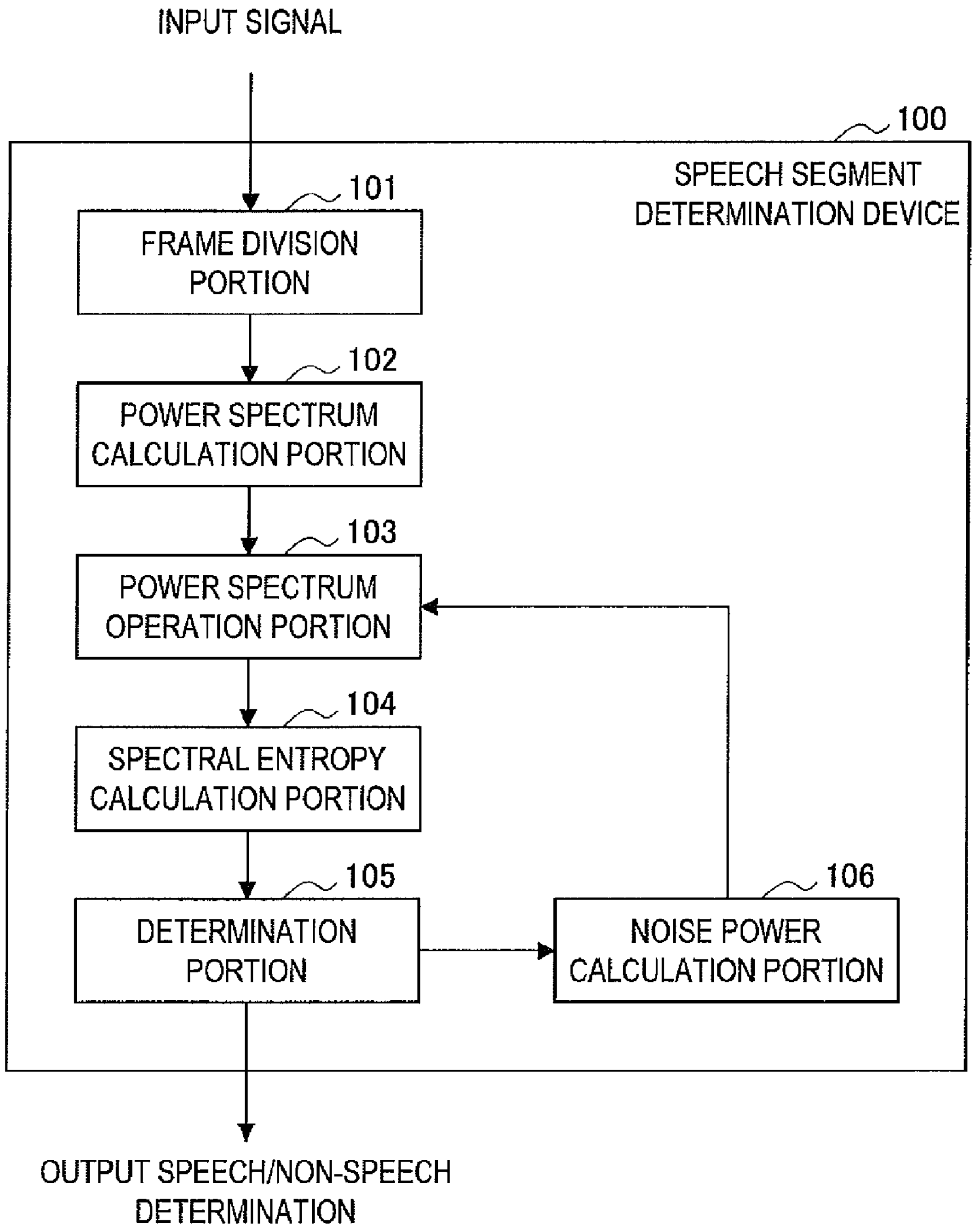
FIG. 3 is a block diagram showing a functional configuration of a speech segment determination device according to the embodiment.

As shown in FIG. 3, a speech segment determination device 100 is an information processing device that has a function of determining a speech segment and a non-speech segment from the input signal. Examples of the information processing device include a mobile phone, a personal computer (PC), a game console, a household appliance, a music playback device, a video processing device, and the like.

The speech segment determination device 100 is provided with a frame division portion 101, a power spectrum calculation portion 102, a power spectrum operation portion 103, a spectral entropy calculation portion 104, a determination portion 105 and a noise power calculation portion 106.

The frame division portion 101 divides an input signal in units of frames. One frame has a predetermined time interval. The time interval for one frame used herein is 80 msec.

The power spectrum calculation portion 102 calculates a power spectrum for each of an analysis length of the input signal that has been divided into frames by the frame division portion 101. Here, the power spectrum calculation portion 102 can calculate the power spectrum using a fast Fourier transform. Further, when the fast Fourier transform is performed, the power spectrum calculation portion 102 may use various types of window functions, such as a Hamming window. Note that the aforementioned analysis length is a unit length for performing the fast Fourier transform.

The power spectrum operation portion 103 increases the power spectrum values in each frequency bin that are calculated by the power spectrum calculation portion 102. Here, the power spectrum operation portion 103 adds the same value to each power spectrum in each frequency bin so that the power spectrum values are uniformly increased regardless of the frequency. More specifically, the power spectrum operation portion 103 may increase the power spectrum values in each frequency bin in response to an average power of noise that is calculated by the noise power calculation portion 106. As described above, when the magnitude of the power spectrum of the colored noise is different from that of the speech signal before the processing by the power spectrum operation portion 103 and the spectral entropy values of the colored noise and the speech signal are similar to each other, it is possible to distinguish between the speech segment and the non-speech segment by increasing the power spectrum. At this time, it is desirable that the increment of the power spectrum be large enough to cause a difference between the spectral entropy values of the noise segment and the speech segment. The power spectrum operation portion 103 can determine the increment of the power spectrum based on a signal-noise (S/N) ratio and noise power. Further, the power spectrum operation portion 103 may determine the increment of the power spectrum to be a value that is 15 dB larger than the average power of noise. Further, the power spectrum operation portion 103 may determine the increment of the power spectrum based on the entropy of noise or a predetermined value of a signal other than noise.

The spectral entropy calculation portion 104 calculates the spectral entropy using the power spectrum whose value is increased by the power spectrum operation portion 103. Here, the spectral entropy calculation portion 104 can calculate the spectral entropy value using the above-described Expression 1 and Expression 2. At this time, it is desirable that the frequency range used to calculate the spectral entropy be a frequency range in which a speech spectrum is included. The frequency range in which the speech spectrum is included is 250 Hz to 4000 Hz.

The determination portion 105 determines whether or not the input signal is a signal in the speech segment based on the spectral entropy value calculated by the spectral entropy calculation portion 104. The determination portion 105 can determine whether or not the input signal is a signal in the speech segment based on a magnitude relationship between a threshold value θ that is set in advance and the calculated spectral entropy value. More specifically, the determination portion 105 can determine that the input signal is a signal in the speech segment when the spectral entropy value is smaller than the threshold value θ, and the determination portion 105 can determine that the input signal is a signal in the non-speech segment when the spectral entropy value is equal to or larger than the threshold value θ.

Note that the above-described threshold value θ is determined based on a maximum value of the spectral entropy that is obtained theoretically. More specifically, the threshold value θ can be a value that is 0.2 percent smaller than the maximum value of the spectral entropy obtained theoretically. When it is assumed that M is the lower limit of the frequency range and N is the upper limit of the frequency range, the maximum value of the spectral entropy is calculated by the following Expression 4.

[Expression 4]

$$H_{max}=-\log_2(N-M) \qquad \text{Expression 4}$$

When the spectral entropy is lower than the threshold value θ by a certain amount or more, the determination portion 105 may determine that subsequent several frames are all speech segments (hangover processing). Specifically, the determination portion 105 starts counting after it determines that the input signal is the signal in the speech segment, based on the magnitude relationship between the threshold value θ and the spectral entropy value calculated by the spectral entropy calculation portion 104. An initial value of the count is a predetermined value. The determination portion 105 determines that the input signal is the signal in the speech segment until the count value becomes 0. Normally, power reduces at the end of speech, and therefore the detection accuracy of the signal in the speech segment deteriorates. However, by performing the hangover processing, the detection accuracy can be improved. The hangover processing is processing that determines that several frames subsequent to the frame in which the count value becomes 0 are all speech segments. A condition to generate the initial value of the count may be a condition that the spectral entropy is lower than the threshold value θ by 1 percent or more. In addition, a time length during which the hangover processing continues can be set to approximately 500 msec.

The noise power calculation portion 106 calculates the average power of noise as a value indicating noise characteristics. The noise power calculation portion 106 calculates an average power of the power spectrum in the segment that is determined as the non-speech segment by the determination portion 105, and thereby calculates the average power of the noise. Only when the determination portion 105 determines that the input signal is not a speech signal, the noise power calculation portion 106 calculates the average power of the power spectrum in the non-speech segment. Then, the noise power calculation portion 106 calculates an average from a calculated plurality of the average power values. The average value of the plurality of average power values is set as the average power of the noise. When the noise power calculation portion 106 calculates the average power of the noise, it sequentially updates the average power of the noise to the most recent average power of the noise. At this time, in order to reduce an influence caused when the determination made by the determination portion 105 is wrong, the noise power calculation portion 106 may update the average power of the noise only when it is determined that the non-speech segment continues for at least 100 milliseconds, for example.

The respective structural elements included in the speech segment determination device 100 according to the embodiment are explained above. The respective structural elements may be formed by hardware, such as a multi-purpose member or a circuit. Alternatively, an information processing device, such as a computer, may execute a program and thus the information processing device may execute the functions of the respective structural elements of the speech segment determination device 100. More specifically, a computation portion, such as a central processing unit (CPU) included in the information processing device, may read the program, in which a processing procedure to achieve the functions of the respective structural elements is described, from a storage medium and may execute the program.

Note that the above-described program may be stored in a remote storage medium that is connected to the information processing device by a network. The information processing device reads the program via the network.

3. Operations

Figure 4:
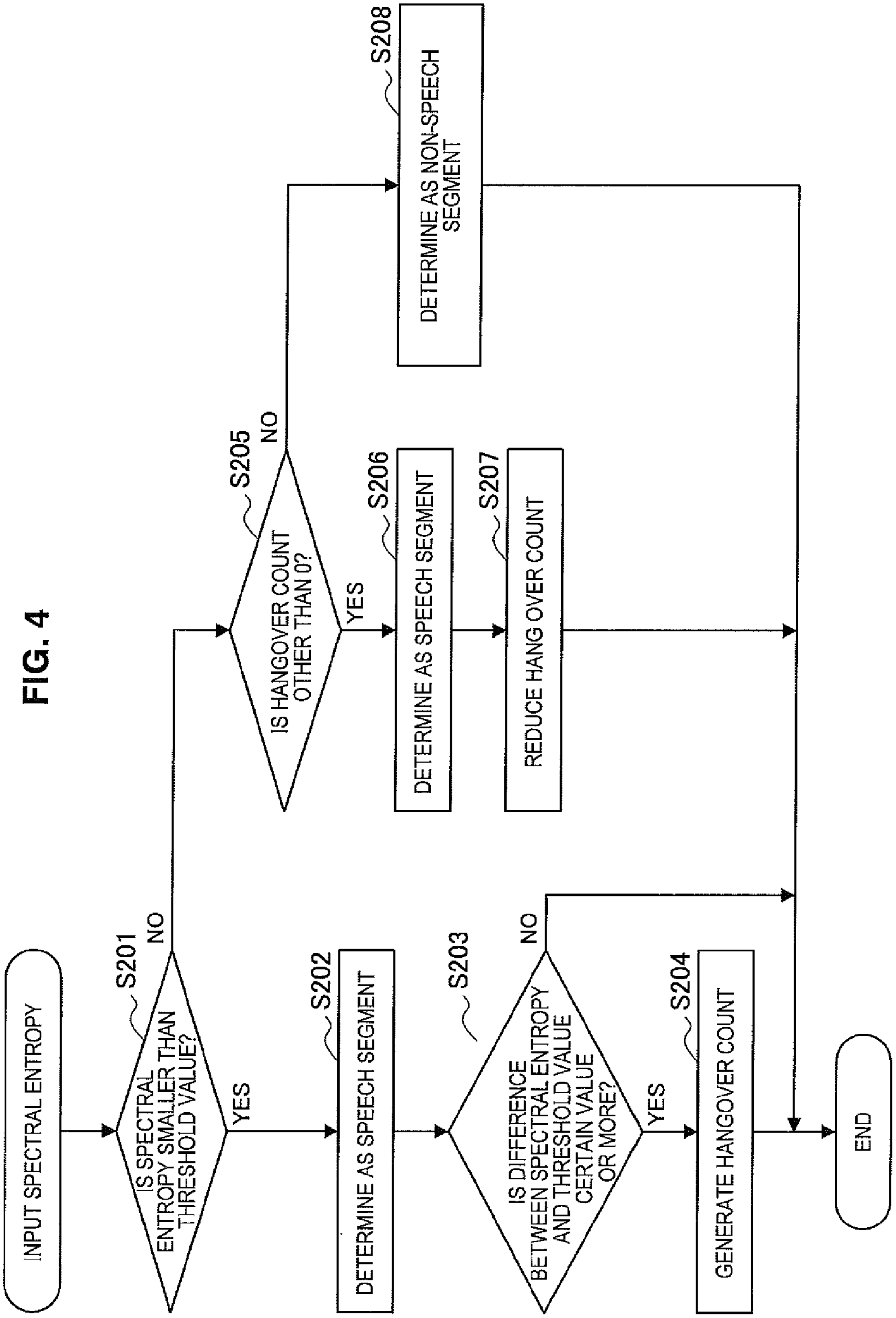
FIG. 4 is a flowchart showing a processing procedure of the speech segment determination method according to the embodiment.

Next, operations of the speech segment determination method according to the embodiment will be explained with reference to FIG. 4.

First, the determination portion 105 determines whether or not the spectral entropy value calculated by the spectral entropy calculation portion 104 is smaller than the threshold value θ (step S201). When the determination portion 105 determines that the spectral entropy value is smaller than the threshold value θ, the determination portion 105 can determine that the input signal is a signal in the speech segment (step S202). The determination portion 105 further determines whether or not the difference between the spectral entropy value and the threshold value θ is equal to or more than a certain value (step S203). When the difference between the spectral entropy value and the threshold value θ is equal to or more than the certain value (yes at step S203), a count value necessary to perform the hangover processing is generated (step S204). On the other hand, when the difference between the spectral entropy value and the threshold value θ is not equal to or more than the certain value (no at step S203), the processing at step S204 is omitted.

On the other hand, when the spectral entropy value is equal to or more than the threshold value θ (no at step S201), then, the determination portion 105 determines whether or not the count value is a value other than 0 (step S205). When the count value is a value other than 0 (yes at step S205), the determination portion 105 determines that the input signal is a signal in the speech segment (step S206). Then, the determination portion 105 reduces the count value by 1 (step S207). On the other hand, when the count value is 0 (no at step S205), the determination portion 105 determines that the input signal is a signal in the non-speech segment (step S208).

4. Example of Effects

Here, operational effects when a known input signal is input to the above-described speech segment determination device 100 will be explained with reference to FIG. 5 to FIG. 8.

Figure 5:
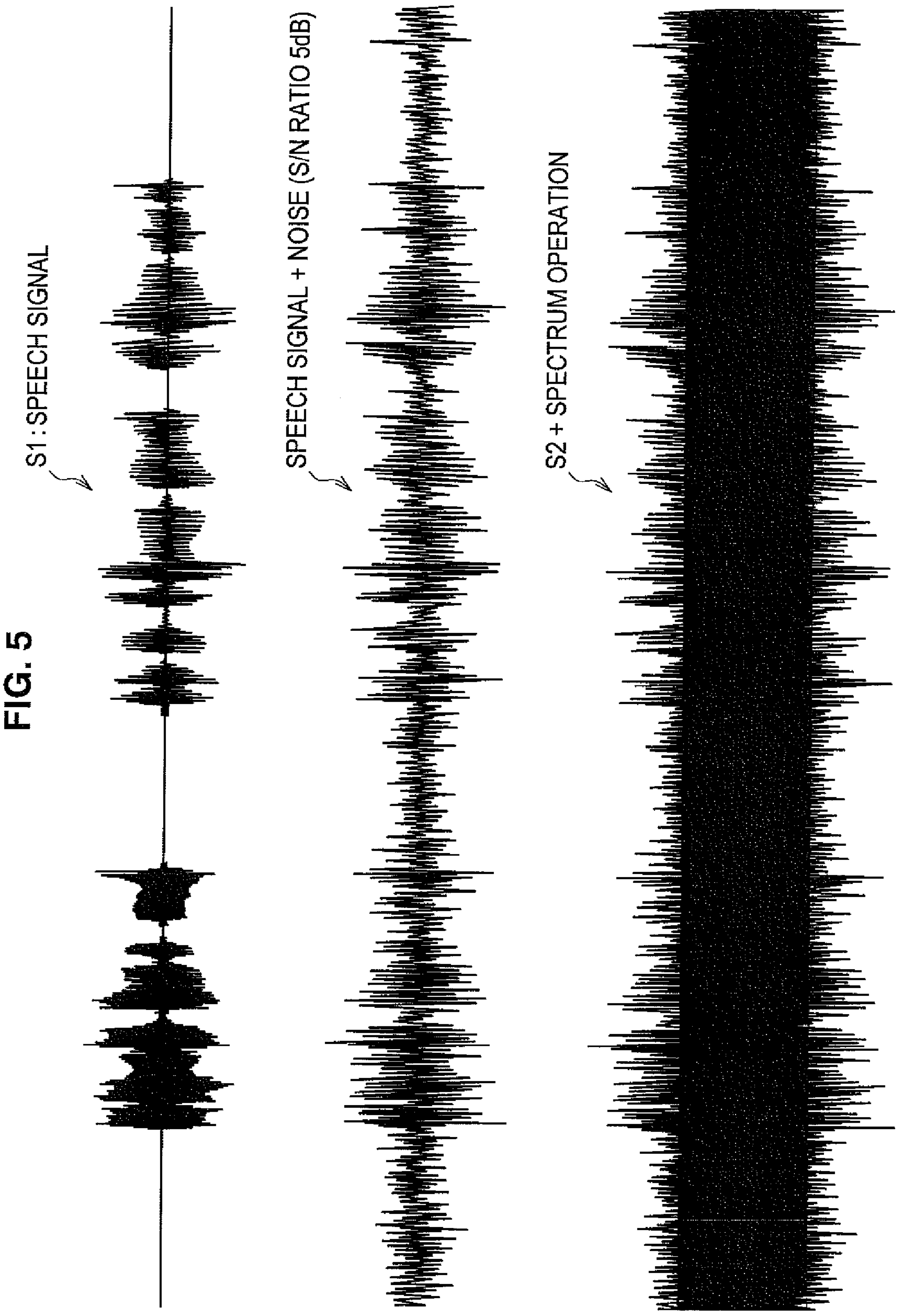
FIG. 5 is a wave form chart showing a speech signal, an input signal, and a signal after a spectrum operation, according to the embodiment.

First, referring to FIG. 5, a known speech signal S1 that is used for experiment is shown. A signal S2 is a signal when the speech signal S1 includes noise and the S/N ratio is 5 dB. The signal S2 is an input signal that is input to the speech segment determination device 100. When the input signal S2 is input to the speech segment determination device 100, the input signal S2 is divided in units of frames by the frame division portion 101 and a power spectrum for each analysis length is calculated by the power spectrum calculation portion 104.

Then, the power spectrum value of each frequency is increased in response to the average power of the noise by the power spectrum operation portion 103. The power spectrum operation portion 103 may increase the power spectrum value in response to the average power of the white noise. A signal waveform after the spectrum operation has been performed by the power spectrum operation portion 103 is indicated by a reference numeral S3 in FIG. 5.

When the input signal is operated by the power spectrum operation portion 103, the entire power of the input signal is increased. At this time, the larger the entire power, the smaller a power ratio difference between respective frequencies with respect to the entire power. As a result, a difference in the presence probability of the respective frequencies becomes smaller, and accordingly, the spectral entropy value becomes larger.

Figure 6:
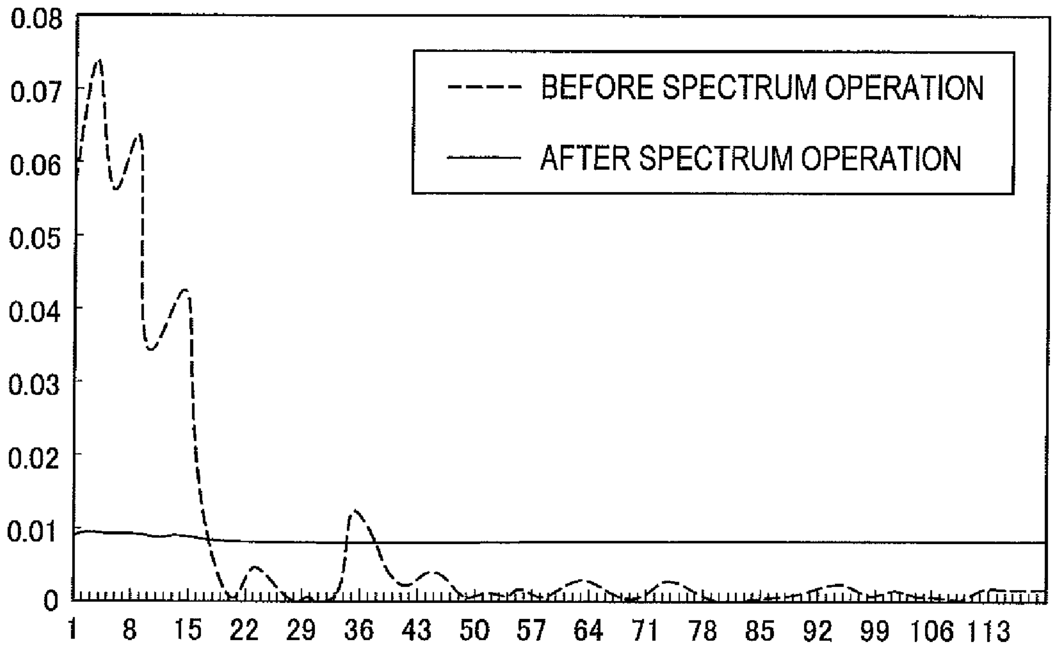
FIG. 6 is a graph showing a change in the presence probability before and after the spectrum operation in a non-speech segment according to the embodiment.
Figure 7:
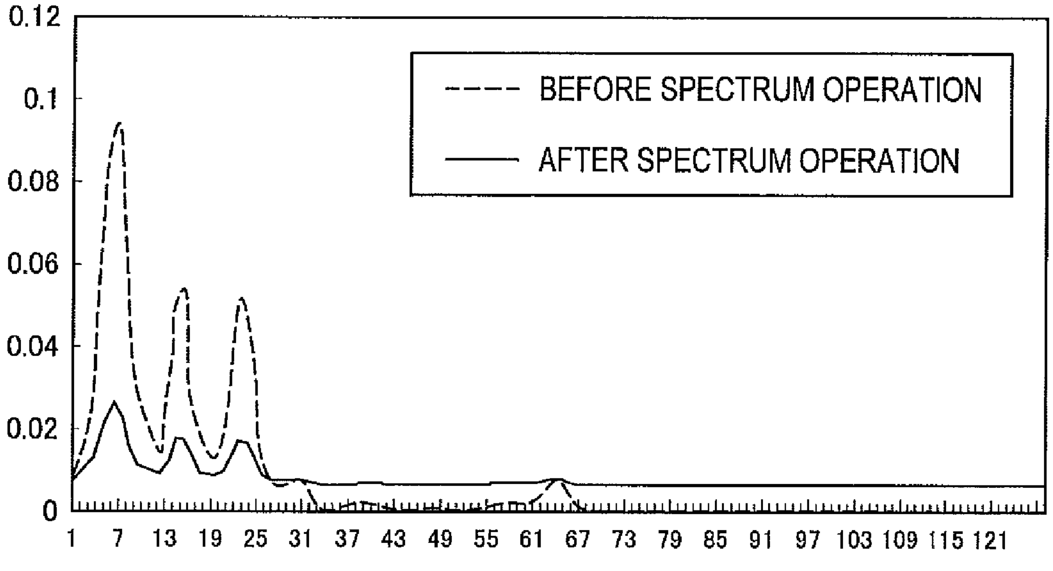
FIG. 7 is a graph showing a change in the presence probability before and after the spectrum operation in a speech segment according to the embodiment.

FIG. 6 shows a change, before and after the spectrum operation, of the presence probability of each frequency bin in the non-speech segment. It can be found that the distribution of the presence probability of each frequency bin is made uniform by the spectrum operation. FIG. 7 shows a change, before and after the spectrum operation, of the presence probability of each frequency in the speech segment. Note that, in FIG. 6 and FIG. 7, the vertical axis represents the presence probability and the horizontal axis represents numbers indicating frequency bins. When comparing FIG. 6 and FIG. 7, it can be found that the degree of change of the presence probability of each frequency is smaller in the speech segment than in the non-speech segment. Therefore, due to the spectrum operation, a difference is generated in the distribution of the presence probability of each frequency bin between the speech segment and the non-speech segment. As a result, a difference is also generated between the spectral entropy values.

Based on the difference between the spectral entropy values generated by the spectrum operation, the determination portion 105 can determine whether the input signal is a signal in the speech segment or a signal in the non-speech segment.

Figure 8:
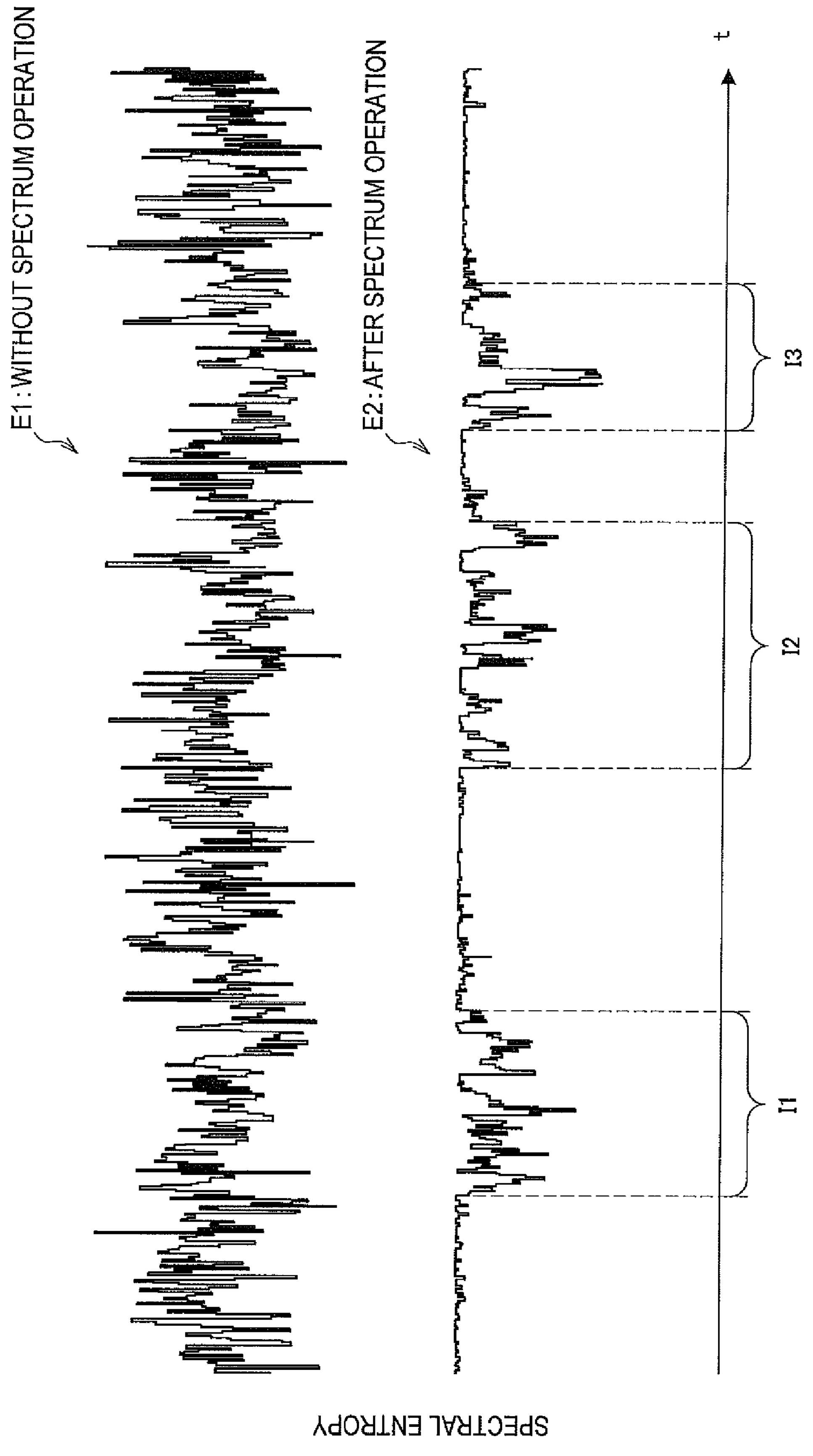
FIG. 8 is a graph showing spectral entropy values before and after the spectrum operation according to the embodiment.

FIG. 8 shows spectral entropy E1 that is calculated from the input signal S2 when the spectrum operation is not performed, and spectral entropy E2 that is calculated from the input signal S3 after the spectrum operation. In the spectral entropy E1, the spectral entropy value randomly changes and a difference in the spectral entropy values is not found between the speech segment and the non-speech segment. In contrast to this, in the spectral entropy E2, a difference in the spectral entropy values occurs between speech segments (I1 to I3) and non-speech segments (other than the speech segments I1 to I3). The determination portion 105 can accurately determine the speech segment I1, the speech segment I2 and the speech segment I3 based on the spectral entropy E2.

As described above, even with the colored noise whose power spectrum is not uniform, it is possible to achieve a uniform probability distribution. With respect to the signal in the speech segment that has larger power than the colored noise, the degree of change in the presence probability due to the spectrum operation is smaller than that of the signal in the non-speech segment. For that reason, the probability distribution of the signal in the speech segment is not uniform. As a result, even when the difference between the spectral entropy of the signal in the speech segment and the spectral entropy of the signal in the non-speech segment is small, a difference is generated by the spectrum operation between the spectral entropy value of the signal in the speech segment and the spectral entropy value of the signal in the non-speech segment.

Therefore, the speech segment determination device 100 can accurately determine the speech segment based on the spectral entropy value. Further, in comparison to the related art, computation processing that is newly added is addition processing only. In the addition processing, a fixed value is added regardless of the frequency. Therefore, it is possible to improve the accuracy of the speech segment determination without having a significant impact on an amount of computation by the speech segment determination device 100. Further, the speech segment determination device 100 is effective for both the input signal that includes stationary noise (colored noise, white noise) and the input signal that includes non-stationary noise (colored noise), and it is possible to improve the accuracy of the speech segment determination.

Further, since the speech segment determination device 100 determines a speech segment only using a target frame for speech segment determination, it can determine the speech segment in real time. More specifically, since the speech segment determination device 100 performs determination without using information (power spectrum etc.) of past and future frames with respect to the target frame for the speech segment determination, the speech segment determination device 100 can determine the speech segment in real time. Further, since the speech segment determination device 100 does not have to use an identifier that has undergone learning in advance, there is no need to secure a memory and computation for learning. Note that, in addition to the target frame for the speech segment determination, the speech segment determination device 100 may determine the speech segment also using a plurality of past frames with respect to the target frame for the speech segment determination.

Hereinabove, the embodiment is explained in detail with reference to the appended drawings. However, the present invention is not limited to the above-described embodiment. Various modifications are possible without departing from the spirit and scope of the present invention.

For example, the speech segment determination device 100 may be used as a part of a mobile phone or a video conference system.

Further, in the above-described embodiment, the processing that performs the hangover processing is explained. However, the hangover processing need not necessarily be performed. Further, it is needless to mention that a technique other than the hangover processing may be combined and used in order to improve the determination accuracy.

Further, in the above-described embodiment, the power spectrum operation that performs a power operation in a frequency domain is explained. However, an operation that increases the power of the input signal in a time domain may be used. In this case, a power operation portion performs a power operation by adding white noise to the divided frames supplied from the frame division portion 101. At this time, the amount of white noise to be added may be a certain amount or may be an amount that is calculated based on noise.

The speech segment determination function explained in the above-described embodiment may be implemented as a function of a video conference system or of a mobile phone, for example. The video conference system and the mobile phone etc. having the speech segment determination function can output clear speech, by extracting the input signal determined as the speech segment.

Note that, in the present embodiment, the steps described in the flowchart may be performed in time series in the order described. Alternatively, a plurality of the steps may be performed in parallel. Moreover, when performing the steps that are processed in time series, the order can be changed as appropriate.

What is claimed is:

1. A speech segment determination device comprising:

a frame division portion that divides an input signal in units of frames;

a power spectrum calculation portion that calculates a power spectrum of the input signal for each of the frames, using an analysis length;

a power spectrum operation portion that adds a value of the calculated power spectrum to a further value at each of a plurality of discrete frequencies;

a spectral entropy calculation portion that calculates spectral entropy using the power spectrum whose value has been increased; and a determination portion that determines that the input signal is a signal in a speech segment if the spectral entropy has a value that is smaller than a threshold value, wherein the determination portion generates an initial value for counting after the determination portion determines that the input signal is a signal in the speech segment, and when the value of the spectral entropy thereafter rises until it is no longer smaller than the threshold value, the determination portion determines that the input signal remains in the speech segment until the initial value for counting is decremented to a predetermined smaller value.

2. The speech segment determination device according to claim 1, wherein the further value is calculated in accordance with an average power of noise in the input signal.

3. The speech segment determination device according to claim 1, further comprising:

a noise power calculation portion that calculates an average power of noise in the input signal by calculating an average power of a power spectrum of a signal in a segment that is determined by the determination portion not to be a signal in the speech segment, wherein the further value is a function of the average power of the noise.

4. The speech segment determination device according to claim 1, wherein the determination portion performs counting until the initial value reaches a predetermined value, and determines that the input signal is a signal in the speech segment from when the counting is started to when the predetermined value is reached.

5. The speech segment determination device according to claim 4, wherein the predetermined value is zero.

6. The speech segment determination device according to claim 1, wherein the analysis length is a unit length when a fast Fourier transform is used for transformation.

* * * * *